US008166491B2

(12) United States Patent
Weiss et al.

(10) Patent No.: US 8,166,491 B2
(45) Date of Patent: Apr. 24, 2012

(54) METHOD AND SYSTEM FOR PROVIDING A CONFIGURABLE ACTION LAUNCHPAD

(75) Inventors: Klaus D. Weiss, Hassloch (DE); Hans-Dieter Loew, Leimen (DE); Janet D. Salmon, Dudenhofen (DE); Stefan-Claudius Mueller, Eggenstein-Leopoldshafen (DE)

(73) Assignee: SAP AG, Walldorf (DE)

( * ) Notice: Subject to any disclaimer, the term of this patent is extended or adjusted under 35 U.S.C. 154(b) by 1119 days.

(21) Appl. No.: 11/950,133

(22) Filed: Dec. 4, 2007

(65) Prior Publication Data

US 2008/0134220 A1    Jun. 5, 2008

Related U.S. Application Data

(60) Provisional application No. 60/872,984, filed on Dec. 4, 2006.

(51) Int. Cl.
*G06F 3/00* (2006.01)
*G06F 9/44* (2006.01)
*G06F 9/46* (2006.01)
*G06F 13/00* (2006.01)

(52) U.S. Cl. ......................................................... 719/329
(58) Field of Classification Search .................. 719/329; 715/724
See application file for complete search history.

(56) References Cited

U.S. PATENT DOCUMENTS

| 6,397,264 | B1 * | 5/2002 | Stasnick et al. | 719/328 |
| 6,925,609 | B1 * | 8/2005 | Lucke | 715/804 |
| 6,971,067 | B1 | 11/2005 | Karson et al. | |
| 8,020,101 | B2 * | 9/2011 | Kesavarapu | 715/724 |
| 2005/0144554 | A1 | 6/2005 | Salmon et al. | |

FOREIGN PATENT DOCUMENTS
WO    2005050476 A1    6/2005

* cited by examiner

*Primary Examiner* — Emerson Puente
*Assistant Examiner* — Kimbleann Verdi
(74) *Attorney, Agent, or Firm* — Kenyon & Kenyon LLP

(57) ABSTRACT

A method includes, during execution of a first application program in which a user interacts with the application program, executing a launchpad service that invokes another application program. When a user interface of the first application program is refreshed, a state of the launchpad service is determined based on the refreshed user interface, and one or more launchpad control elements are displayed along with the user interface depending on the determined state of the launchpad service. When the launchpad control element is activated by an operator, execution of a second application program referenced by the activated control element is initiated and advanced to a processing stage determined by the activated control element.

12 Claims, 11 Drawing Sheets

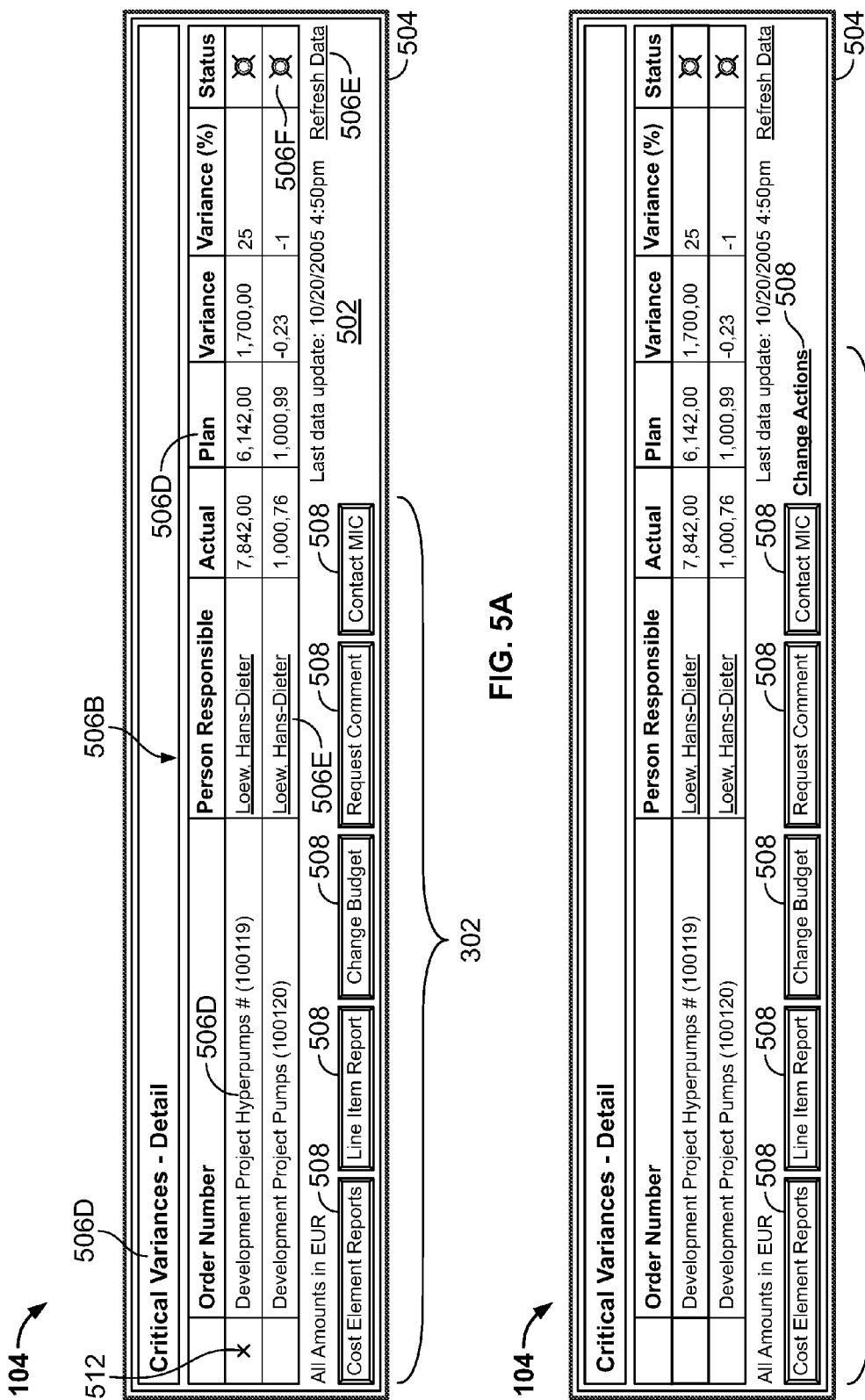

FIG. 5B

Display Actual Cost Line Items for Cost Centers

| Postg Date | ^ Cost Elem. | Cost element name | DocTyp | ΣVal.in rep.cur. | OffAct | Offst.acct |
|---|---|---|---|---|---|---|
| 29.12.200 | 470000 | Office & Building | KR | 63,00 | K | 3802 |
| 26.05.2005 | | Office & Building | KR | 61,69 | K | 3802 |
| 28.01.2004 | | Office & Building | KR | 61,20 | K | 3802 |
| 28.02.2004 | | Office & Building | KR | 58,80 | K | 3802 |
| 28.03.2004 | | Office & Building | KR | 62,40 | K | 3802 |
| 28.04.2004 | | Office & Building | KR | 63,60 | K | 3802 |
| 20.05.2004 | | Office & Building | KR | 61,20 | K | 3802 |
| 28.06.2004 | | Office & Building | KR | 59,40 | K | 3802 |
| 28.07.2004 | | Office & Building | KR | 60,60 | K | 3802 |
| 28.08.2004 | | Office & Building | KR | 61,20 | K | 3802 |
| 28.09.2004 | | Office & Building | KR | 60,00 | K | 3802 |
| 28.10.2004 | | Office & Building | KR | 60,60 | K | 3802 |
| 01.04.2006 | | Office & Building | KR | 64,11 | K | 3802 |
| 01.06.2006 | | Office & Building | KR | 59,88 | K | 3802 |
| 27.01.2005 | | Office & Building | KR | 64,26 | K | 3802 |
| 30.03.2005 | | Office & Building | KR | 62,90 | K | 3802 |
| 29.11.2004 | | Office & Building | KR | 57,60 | K | 3802 |
| 28.07.2005 | | Office & Building | KR | 61,08 | K | 3802 |
| 09.01.2006 | | Office & Building | KR | 61,69 | K | 3802 |
| 26.08.2005 | | Office & Building | KR | 61,69 | K | 3802 |
| 01.08.2006 | | Office & Building | KR | 60,48 | K | 3802 |
| 01.09.2006 | | Office & Building | KR | 61,08 | K | 3802 |
| 01.07.2006 | | Office & Building | KR | 60,48 | K | 3802 |
| 12.09.2005 | | Office & Building | KR | 63,50 | K | 3802 |
| 29.12.2005 | | Office & Building | KR | 59,27 | K | 3802 |
| 25.02.2005 | | Office & Building | KR | | | |

METHOD AND SYSTEM FOR PROVIDING A CONFIGURABLE ACTION LAUNCHPAD

CROSS-REFERENCE TO RELATED APPLICATIONS

This application claims the benefit of and priority to U.S. Provisional Patent Application No. 60/872,984, to Klaus D. Weiss, Hans-Dieter Low, Janet D. Salmon, and Stefan-Claudius Müller, filed on Dec. 4, 2006, entitled "Configurable Action Launchpad," which is herein incorporated by reference in its entirety.

BACKGROUND INFORMATION

Modern businesses often use computer systems to support their operations. Indeed, many businesses use an integrated suite of applications that operate as an enterprise management system (EMS) to manage business functions. In an EMS system, almost any business operation—product planning, product manufacturing, inventory control, product sales and distribution and human resources—can be modeled by the EMS system. Business employees interact with a computerized EMS system to perform transactions that represent business operations. In this way, the computerized EMS system can track business operations and develop data records on which to analyze and forecast business performance.

An EMS system often includes multiple discrete computer applications that are devoted to specific functions within the larger system. For example, a separate application may be provided for each of the business operations listed above—product planning, product manufacturing, inventory control, product sales and distribution and human resources (called "transactional" applications herein). Other applications may be provided to perform statistical studies of business operations ("analytical" applications), which generate reports from transactional data. Although an EMS system may provide a loose coupling among the transactional and analytical applications by allowing a user to launch them from a common login screen of the EMS system, the transactional and analytical applications are used separately.

One problem with implementing transactional and analytical applications separately is that, during the use of one of these types of applications, it may be desirable to simultaneously use the other type in a related way, and there is currently no satisfactory way of doing this. For example, a user may perform a particular transaction, such as a budget-related transaction, and desire to see a report related to the transaction, such as a budget analysis report for a particular month. Because the transaction and the analytical report are typically implemented by separate applications, this requires the user to independently find and launch the analytical application, and in the process momentarily leave behind the transactional application to do so. However, leaving the transactional application to find and launch the analytical application is undesirable because it breaks the work flow of the transaction, potentially reducing the efficiency of the user. Moreover, independently launching the analytical application requires the user to manually configure the analytical application to be in a state which is relevant to the transaction being conducted in the transactional application, which is also inefficient.

Furthermore, the specific analytical application which is desired by the user may not always be the same, and may depend in part on the type of transaction being conducted in the transactional application. However, EMS systems currently typically display a static list of available analytical applications. Therefore, a further inefficiency is incurred, if the user always has to choose from the same static list of analytical applications, because the user must browse through many second applications that are unrelated to the transaction being conducted.

These problems are also not necessarily limited to the interplay between transactional and analytical applications, but can instead generally occur whenever a user performs a service in a first application, and simultaneously needs access to a related service in a second application. Thus, a need exists in the art for a way to launch a second application, e.g. an analytical application, without necessitating leaving behind a first application, e.g., a transactional application, to locate and launch the second application. There is a further need to not necessitate unnecessarily browsing by the user through a list of unrelated applications to locate the desired second application. There is an even further need for the launching of the second application to be performed in a way that relates to data being manipulated in the first application.

A method includes executing a first application program in which an operator interacts with the first application. During the execution of the first application, a launchpad service is simultaneously executed that is configured to invoke another, second application program. When a user interface of the first application program is refreshed, a state of the launchpad service is determined based on content of the refreshed user interface, and one or more launchpad control elements are displayed along with the refreshed user interface. When one of the launchpad control elements is activated by an operator, the launchpad service initiates execution of a particular second application program referenced by the activated control element, and advances execution of the second application program to a processing stage determined by the activated control element.

BRIEF DESCRIPTION OF THE DRAWINGS

So that features of the present invention can be understood in detail, a description of the invention can be had by reference to embodiments, some of which are illustrated in the appended drawings. It is to be noted, however, that the appended drawings illustrate only particular embodiments of the invention and are therefore not to be considered limiting of its scope, for the invention may admit to other equally effective embodiments.

FIG. 5A depicts one embodiment of a display of a particular launchpad instance in association with a particular context of a first application.

FIG. 5B depicts one embodiment of a second application launched by the selection of a control element of the launchpad instance depicted in FIG. 5A.

FIG. 12 depicts one embodiment of the display of the launchpad instance in association with the application context, the launchpad instance having a control element which launches the user configuration interface.

DETAILED DESCRIPTION

A method includes executing a first application program in which an operator interacts with the first application. During the execution of the first application, a launchpad service is simultaneously executed that is configured to invoke another, second application program. When a user interface of the first application program is refreshed, a state of the launchpad service is determined based on content of the refreshed user interface, and one or more launchpad control elements are displayed along with the refreshed user interface. When one of the launchpad control elements is activated by an operator, the launchpad service initiates execution of a particular second application program referenced by the activated control element, and advances execution of the second application program to a processing stage determined by the activated control element.

Figure 1:
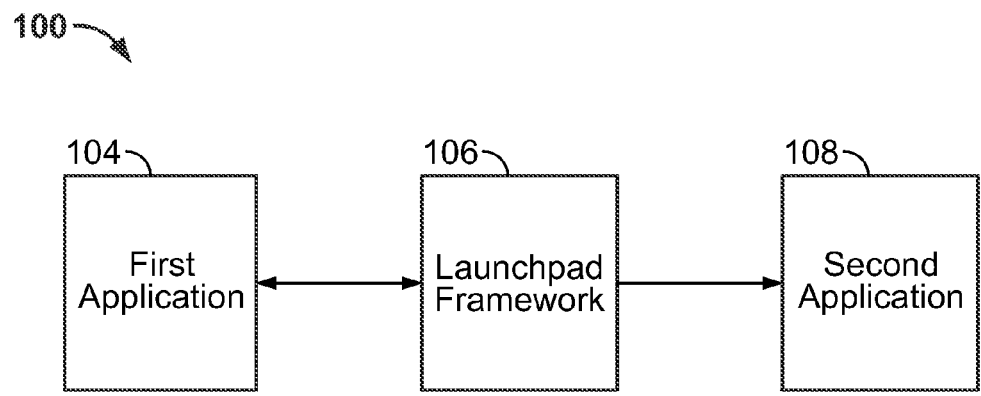
FIG. 1 is a schematic diagram depicting one embodiment of a software architecture.

FIG. 1 is a schematic diagram which depicts an exemplary embodiment of a software architecture 100. The software architecture 100 may include a first application 104, a launchpad framework 106 and at least one second application 108. For example, the first and second applications 104, 108 can be members of a traditional EMS application suite, and provide EMS services as described above. The launchpad framework 106 provides the launchpad service, which is a context-based inter-application service that enables a user to select and launch the second application 108 without leaving the first application 104 and in a manner that is relevant to activities being performed in the first application 104. The first application 104 is capable of communicating with the launchpad framework 106, and the launchpad framework 106 is capable of communicating with the first application 104 and the second application 108. The launchpad framework 106 itself can include a plurality of software components, some of which can optionally be embedded in the first application 104.

Figure 2:
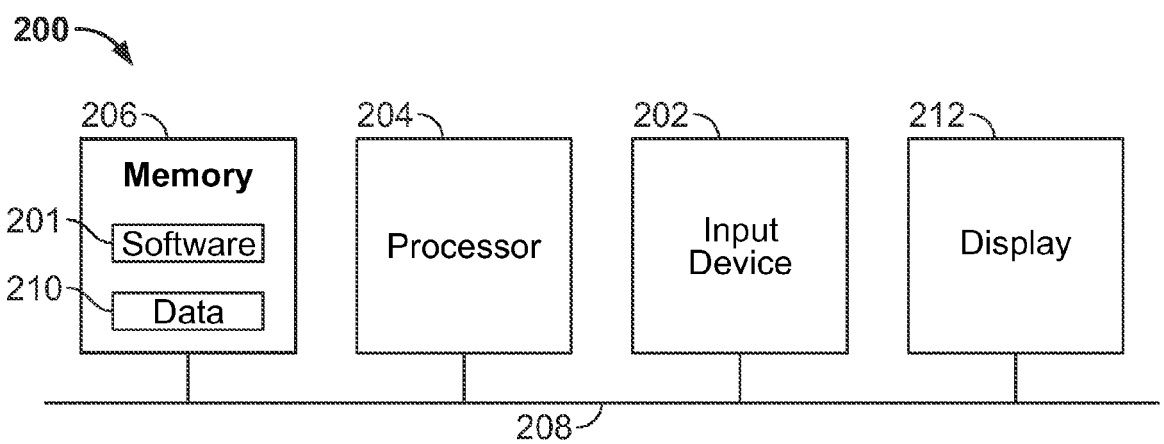
FIG. 2 is a schematic diagram depicting one embodiment of a computing environment.

FIG. 2 depicts an exemplary embodiment of a computing environment 200, in which the software architecture 100 runs in, and is part of. The depicted embodiment of the computing environment 200 includes an input device 202, a processor 204, a memory 206, a communication line 208 and a display 212. The input device 202 enables the user to enter input during the use of the software architecture 100, and can include a keyboard, a mouse, a voice activated controller or other suitable input device. The display 212 enables display of information to the user during the use of the software architecture 100, and can include a monitor, a television, a projector, or other suitable display device. The memory 206 enables the storage of data 210 and software 201 during the use of the software architecture 100, and can include a random access memory, a disk storage memory, or other suitable memory. The data 210 optionally includes data which is integral to a database. The software 201 can include the software architecture 100. The software 201 includes computer program instructions which can be accessed and executed by the processor 204, and can be implemented in any suitable software language such as, for example, ABAP, Java, C, and C++.

The memory 206, processor 204, input device 202 and display 212 are connected together and communicate with each other by means of the communication line 208. The communication line 208 can include a system bus, and thus the computing environment 200 can be a single computer. The communication line 208 can also include a network element, and thus the computing environment 200 can be a distributed computing environment. In a distributed computing environment 200, the memory 206, processor 204, input device 202 and display 212 can optionally be distributed across different locations; there may be a plurality of some or all of the memory 206, processor 204, input device 202 and display 212; and the software 201 can optionally be distributed across a plurality of different memories 206 and be accessible and executable by a plurality of different processors 204. Other embodiments of the computing environment 200 are also possible.

Figure 3:
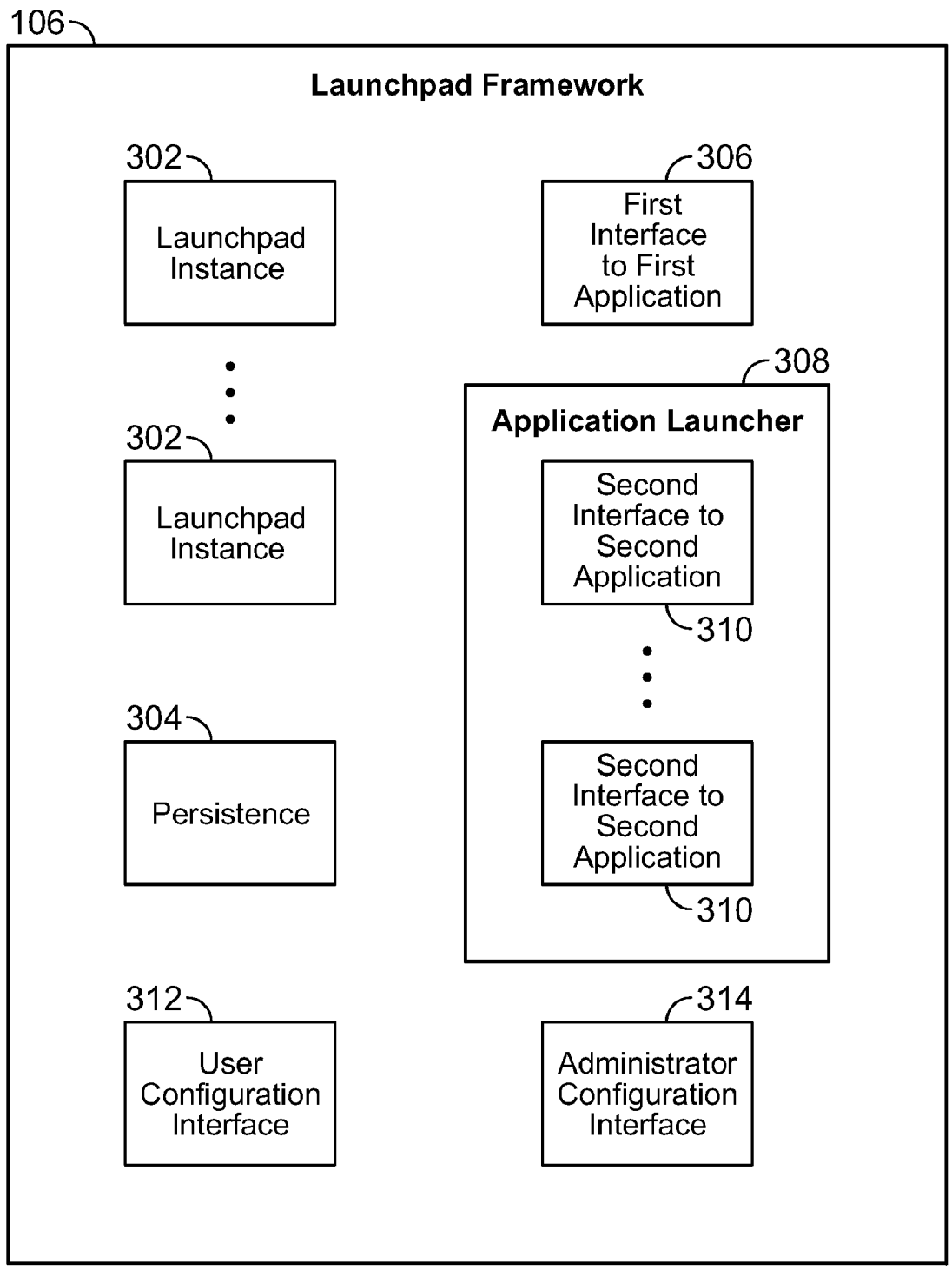
FIG. 3 is a schematic diagram depicting one embodiment of a launchpad framework.

FIG. 3 is a schematic diagram depicting an exemplary embodiment of the launchpad framework 106 which provides the launchpad service. The depicted embodiment of the launchpad framework 106 includes a plurality of launchpad instances 302, a launchpad persistence 304, a first interface 306 to the first application 104, an application launcher 308, a user configuration interface 312 and an administrator configuration interface 314. Generally speaking, each launchpad instance 302 is an application launchpad which is displayed in association with a particular configuration of the first application 104. The application launchpad, i.e., the launchpad instance 302, has selectable control elements which launch particular second applications 108, the identifies of which are related to the current configuration of the first application 104. A particular launchpad instance 302 (of the plurality of launchpad instances 302) is a particular configuration of the application launchpad which displayed in association with a particular configuration of the user interface of the first application 104.

Regarding the other components of the launchpad framework 106, the launchpad persistence 304 is a storage of information which defines both (i) which launchpad instances 302 is displayed in association with which configurations of the first application 104, and (ii) which control elements are included in which launchpad instances 302. The application launcher 308 is the component which actually launches the second application based on the selected control element of the launchpad instance 302. The application launcher 308 includes at least one second interface 310 to the second application 108, and can optionally include a plurality of second interfaces 310 to a plurality of different second applications 108. The user and administrator configuration interfaces 312, 314 are components which enable the user or an administrator, respectively, to update the information stored in the launchpad persistence 304, and thus tailor the operation of the launchpad service to the needs of a particular user.

Components of the launchpad framework 106 can each be a separately encapsulated set of computer program instructions which includes all of the computer program instructions necessary to perform the tasks assigned to that component of the launchpad framework 106. Moreover, the separately encapsulated set of computer program instructions can also optionally be separately executable by the processor 204, without reference to the computer program instructions of another component of the launchpad framework 106.

Figure 4:
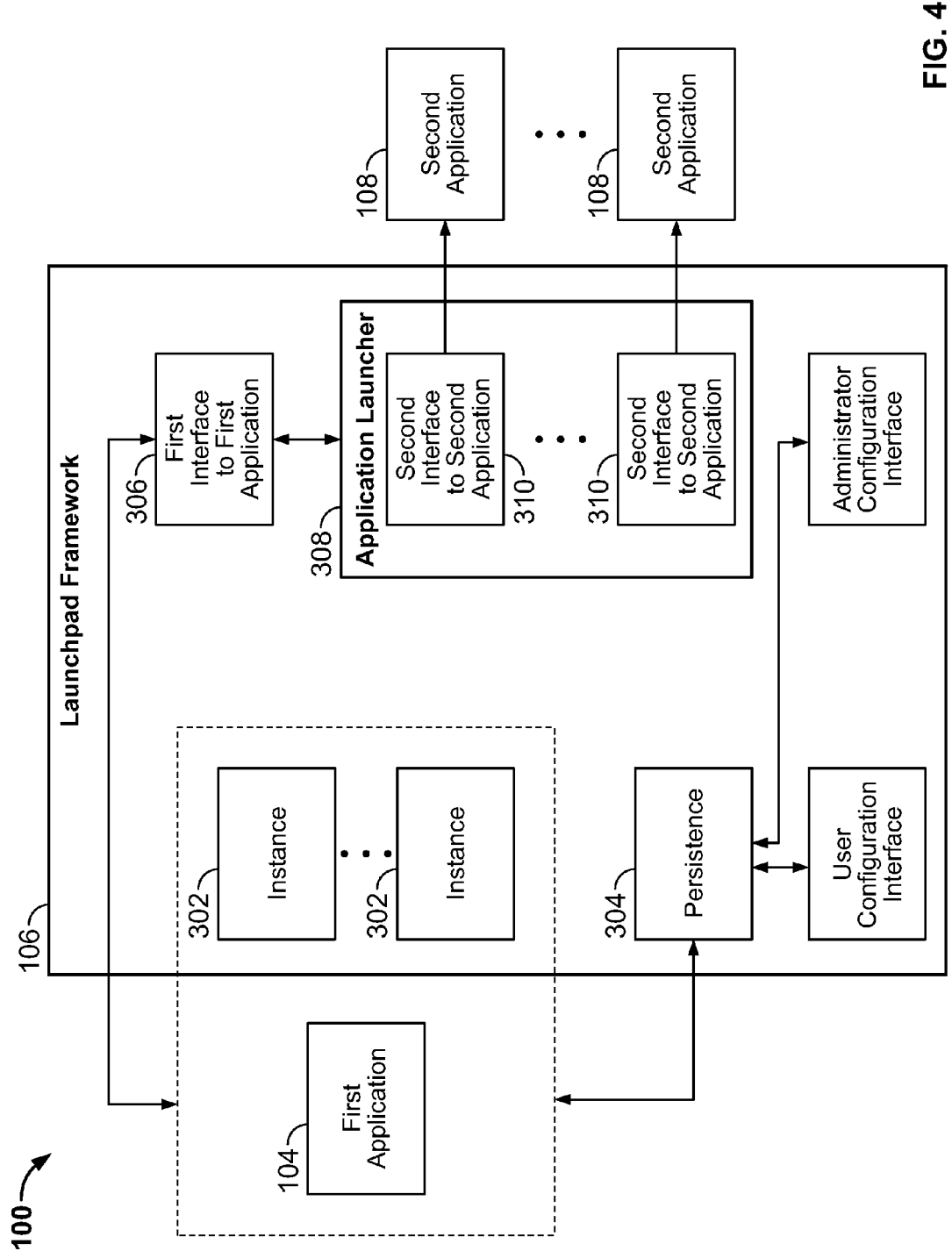
FIG. 4 is a schematic diagram depicting in greater detail the embodiment of the software architecture depicted in FIG. 1.

FIG. 4 is a schematic diagram depicting the software architecture 100 in greater detail. In FIG. 4, a dashed line surrounding the first application 104 and the plurality of launchpad instances 302 indicates that the launchpad instances 302 can either be embedded or not embedded in the first application 104. FIG. 4 depicts one embodiment of paths of communication between the components of the launchpad framework 106 and the first and second applications 104, 108. In FIG. 4, the paths of communication are indicated by lines with arrows, the arrows indicating a direction of communication. Other paths of communication are also possible, as necessary to implement functionality of the launchpad framework 106 described herein.

Figures 6A, 6B:
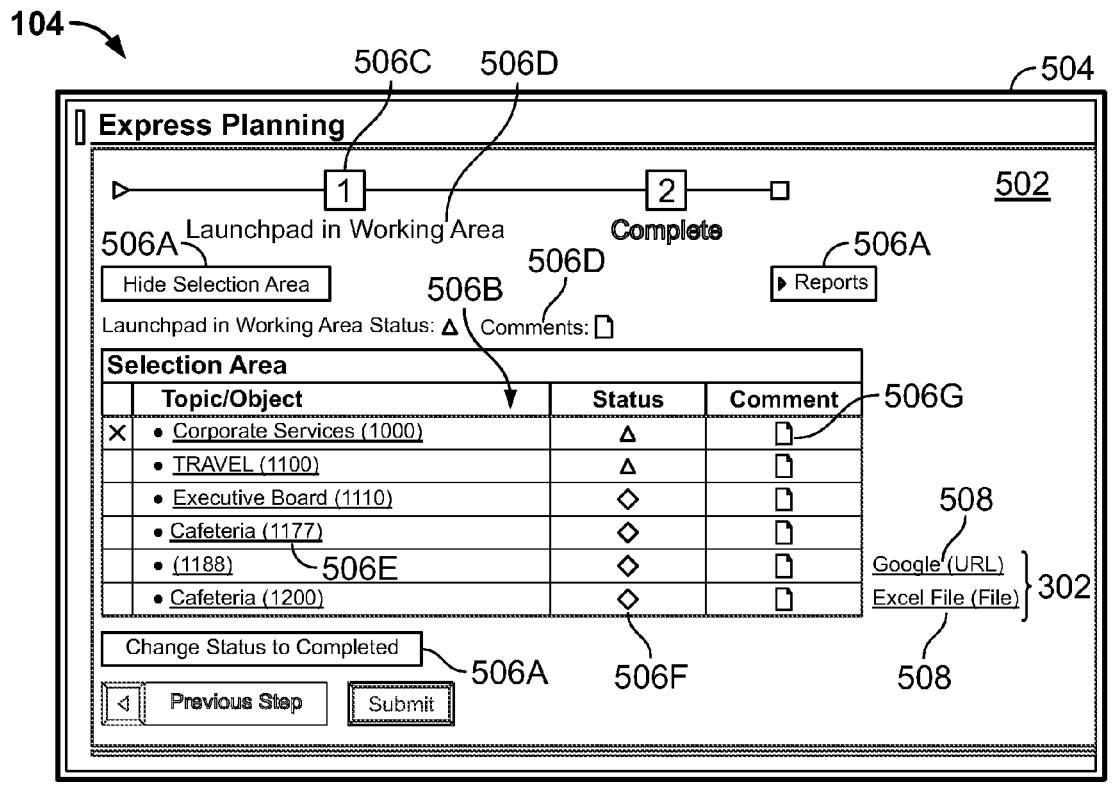
FIG. 6A depicts another embodiment of the display of a particular launchpad instance in association with a particular context of the first application.
FIG. 6B depicts another embodiment of the second application launched by the selection of the control element of the launchpad instance depicted in FIG. 6A.

A further understanding of the nature of the launchpad service, and the components of the launchpad framework 106, can be had by examining various examples as follows. FIGS. 5A and 6A depict exemplary embodiments of the display of a particular launchpad instance 302 in association with a particular context 502 of the first application 104. The launchpad instance 302 which is displayed with the first application 104 is determined by the state of the first application 104, which is herein referred to as the context 502 of the first application 104. The context 502 of the first application 104 can be determined by either its visual state or its internal data state. The visual state of the first application 104 includes the configuration of the user interface 504 which is displayed to the user, such as which user interface elements 506 are displayed and how they are arranged. A first visual state is different from a second visual state if any of the user interface elements 506 of the two configurations is different. The internal data state of the first application 104 is characterized by the values of internal variables of the application 104 while the application 104 is executing. An internal variable is any variable maintained by the application 104 while it is executing. A first data state is different from a second data state if any of the maintained internal variables have different values between the states.

FIG. 5A depicts an exemplary launchpad instance 302 displayed in association with an exemplary context 502 of the first application 104. Likewise, FIG. 6A depicts the display of another exemplary launchpad instance 302 in association with another exemplary context 502 of the first application 104. In FIGS. 5A and 6A, the depicted contexts 502 of the first application 104 are different because they each include different visual states, i.e., different configurations of the user interface 504. Typically, the context 502 of the first application 104 is changed by the user providing a navigation input to one of the user interface elements 506 of the user interface 504 of the first application 104.

Note that the embodiments of the contexts 502 and the launchpad instances 302 depicted in FIGS. 5A and 6A are exemplary, and the application contexts 502, as well as the launchpad instances 302, may have other visual configurations. Note also that not all of the user interface elements 506 of the user interface 504 have been labeled with reference numbers in FIGS. 5A and 6A. Instead, representative user interface elements 506 have been labeled, such as, for example, buttons 506A, tables 506B, graphical elements 506C, non-linking text 506D, linking text 506E, non-linking icons 506F, and linking icons 506G. However, any visual element of the user interface 504 of the first application 104 can be a user interface element 506.

Each launchpad instance 302 includes at least one control element 508, and can include a plurality of control elements 508. For example, in the embodiment depicted in FIG. 5A, the launchpad instance 302 includes five control elements 508, labeled Cost Element Reports, Line Item Report, Change Budge, Request Comment and Contact MIC, respectively; and in the embodiment depicted in FIG. 6A, the launchpad instance includes two control elements 508, labeled Google (URL) and Excel File (URL), respectively. The control element 508 is capable of being selected by the user of the first application 104. Each control element 508 is associated with an action to be performed at least partially by the second application 108 upon selection of the control element 508. In response to the control element 508 being selected, a process is initiated that launches the second application 108 to perform the action associated with the control element 508. The control element 508 can have a variety of visual forms. Each control element 508 can include at least one of: a textual item or a graphical item.

The launchable action which is associated with a control element 508 of a particular launchpad instance 302 is determined by the particular context 502 in which the particular launchpad instance 302 is displayed. The launchable action can also be related to the selection state of items of user interface 504 other than the selected control element 508 of the launchpad instance 302.

Returning to the launchpad persistence 304, the persistence 304 is a storage which stores information that defines the nature of each of the plurality of launchpad instances 302. The persistence 304 can include definitions 1002 (shown in FIG. 7A) of each of the plurality of launchpad instances 302, and the display associations (shown in FIG. 7B) between particular contexts 502 and each of the plurality of launchpad instances 302. In one example, the persistence 304 can include a database.

The information stored in the persistence 304 can include information that enables each launchpad instance 302 to be constructed by the first application 104 or a component of the launchpad framework 106. For example, in an embodiment in which the launchpad instances 302 are embedded in the first application 104, the first application 104 can optionally include a template set of computer program instructions that it populates based on the information stored in the persistence 304 to create a particular launchpad instance 302. In another example, in an embodiment in which the launchpad instances 302 are not embedded in the first application 104, the launchpad framework 106 can optionally include the template set of computer program instructions that is populated based on the information stored in the persistence 403 to create a particular launchpad instance 302.

Figure 7A:
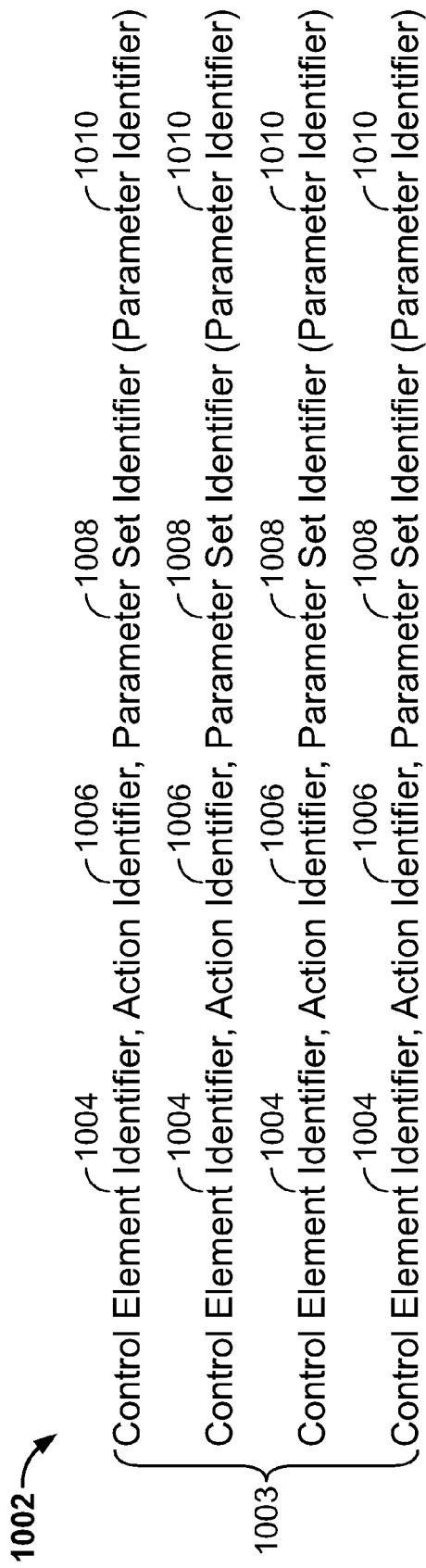
FIG. 7A depicts one embodiment of a definition of a launchpad instance.

FIG. 7A depicts an exemplary embodiment of the definition 1002 of the launchpad instance 302 that is stored by the persistence 304. The definition 1002 can include an ordered list 1003 of control element identifiers 1004, an associated action identifier 1006 (shown in FIG. 10B) for each control element identifier 1004, and a parameter set identifier 1008 for each control element identifier 1004. The ordered list 1003 of control element identifiers 1004 identifies the control elements 508 which the particular launchpad instance 302 includes, and their order of appearance in the launchpad instance 302. Each control element identifier 1004 identifies the composition of one control element 508. For example, if the control element 508 includes a textual control element

508, the control element identifier 1002 can include the text of the textual control element 508. If the control element 508 includes a graphical control element 508, the control element identifier 1002 can include at least one of: a graphic, a name of the graphic, or a location of the graphic. The action identifier 1006 identifies the action which is to be launched when the associated control element 508 is selected. The action identifier 1006 identifies both the action to be launched and the particular second application 108 in which the action is to be launched. The action identifier 1006 optionally includes information in a command format of the particular second application 108. The parameter set identifier 1008 identifies the parameter set which is associated with the launchable action, and can include at least one parameter identifier 1010 which identifies at least one parameter. The parameter set can optionally include a plurality of parameters, and thus the parameter set identifier 1008 can optionally include parameter identifiers 1010 for each of the plurality of parameters. The parameter set identifier 1008 can include a name of the parameter set, and the parameter identifier 1010 can include a name of the parameter. The definitions 1002 stored in the persistence 304 are discussed again in more detail below in regards to FIG. 11A.

Figure 7B:
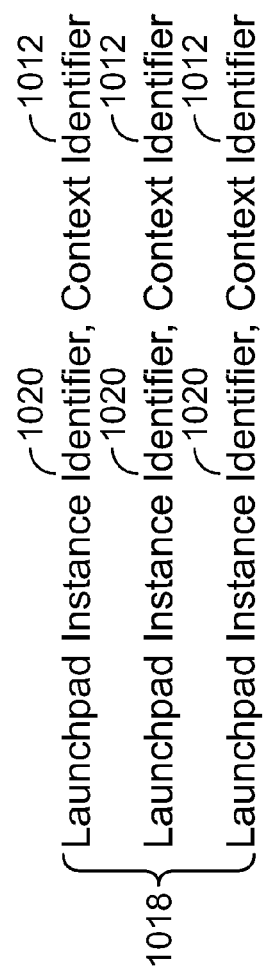
FIG. 7B depicts one embodiment of information defining the display association of launchpad instances with application contexts.

FIG. 7B depicts an exemplary embodiment of the information related to the display association of each instance 302 that can be stored in the launchpad persistence 304 to identify for each launchpad instance 302 the context 502 with which it is to be displayed in association. The depicted embodiment of the display association information includes a list 1018 of launchpad instance identifiers 1020, each of which is associated with at least one context identifier 1012, which identifies the context 502 with which the associated launchpad instance 302 is to be displayed. The stored display association information can optionally identify for each launchpad instance 302 a plurality of contexts 502 with which it is to be displayed in association with. The stored display association information is discussed in more detail below in regards to FIG. 11B.

Returning to the first interface 306, this component of the launchpad framework 106 communicates between the first application 104 and the launchpad framework 106. The first interface 306 is configured to communicate with the first application 104 to determine values of any parameters of any parameter sets associated with a selected control element 508 of the launchpad instance 302. The first interface 306 is further configured to provide the parameter value received from the first application 104 to components of the launchpad framework 106 that require the parameter value. In the embodiment depicted in FIG. 4, the first interface 306 can provide the received parameter value to the application launcher 308, which uses the parameter value in conjunction with launching the second application 108 to perform the action associated with the selected control element 508.

Returning to the application launcher 308, this component of the launchpad framework 106 is configured to launch the second application 108 to perform the action associated with the selected control element 508. The application launcher 308 includes at least one second interface 310 to at least one second application 108. The application launcher 308 is configured to communicate with the second application 108 through the second interface 310 to launch the second application 108, provide to the second application 108 an indication of the action to be executed, and provide to the second application 108 any parameter values received from the first application 104. In some embodiments, such as the embodiments depicted in FIGS. 3 and 4, the application launcher 308 includes a plurality of the second interfaces 310 to a plurality of different second applications 108. Each second interface 310 to a different second application 108 is configured to implement a proper communication protocol for communicating with that particular second application 108. Each second application 108 may have a different communication protocol which dictates the nature of the communication between the second interface 310 and the second application 308. The second interface 310 can include a means for constructing commands to be communicated to, and executed by, the second application 108. The commands can optionally indicate both the action to be launched and any associated parameter value.

Figure 8:
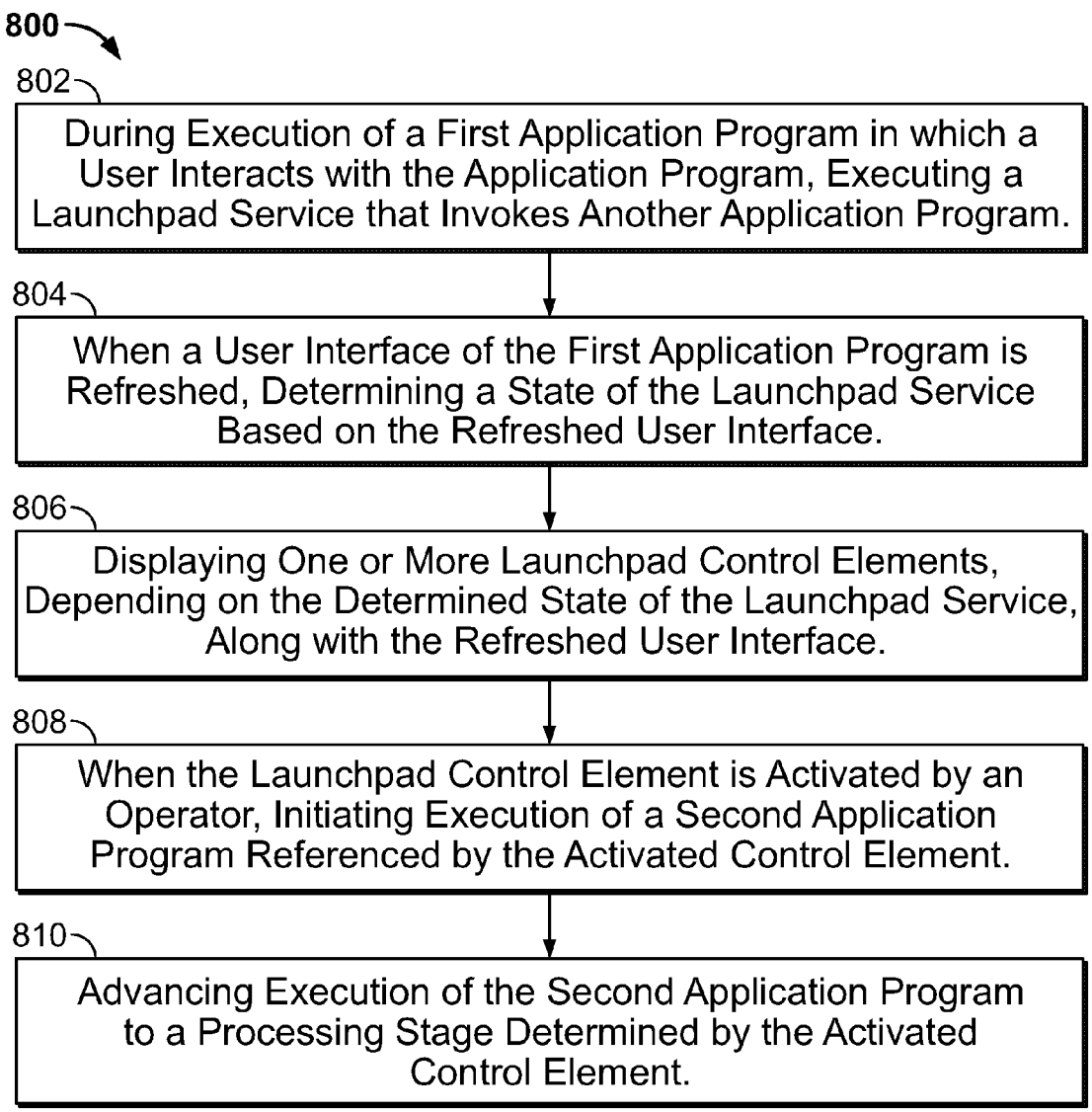
FIG. 8 is a flow chart depicting a schematic representation of one embodiment of a method.

FIG. 8 is a flow chart depicting a schematic representation of one embodiment of a method 800. The depicted method 800 is suitable to be performed within the context of the software architecture 100 depicted in FIGS. 1 and 4. The method 800 can also be performed with other embodiments of the software architecture 100. The components of the software architecture 100 can include computer program instructions, which when executed by the processor 204, enable the performance of the method 800. For example, components of the launchpad framework 106 can include computer program instructions, which when executed by the processor 204, enable the performance of the embodiment of the method 800 depicted in FIG. 8. Further, a computer-readable medium can store the computer program instructions, which when executed by the processor 204, enable the performance of the method 800. Also, a system can include means to perform each of the steps of the method 800. For example, the means to perform each of the steps of the method 800 include elements of the computing environment 200.

In FIG. 8, at step 802, during execution of the first application 104, in which the user interacts with the first application 104, the launchpad service configured to launch the second application 108 is executed. As used herein, the term launchpad service refers to the capabilities of the launchpad framework 106 described herein. At step 804, when the user interface 504 of the first application 104 is refreshed, a state of the launchpad service is determined based on the refreshed user interface. That is, each time the user navigates to a different context 502 of the first application 104, the makeup of the launchpad instance 302 which is to be displayed with the new context 502 is determined based on the new context 502. Although the embodiment of the method 800 depicted in FIG. 8 determines a new launchpad instance 302 for each new configuration of the user interface 504, in other embodiments the determination can also occur based on any change of the context 502, for example a change of an internal data state of the first application 104. At step 806, once the determination of the new launchpad instance 302 (i.e., the determination of the state of the launchpad service) has been made, the determined launchpad instance 302 is displayed. That is, the launchpad control elements 508 which make up that determined instance 302 are display in association with the refreshed user interface 504.

Figure 9:
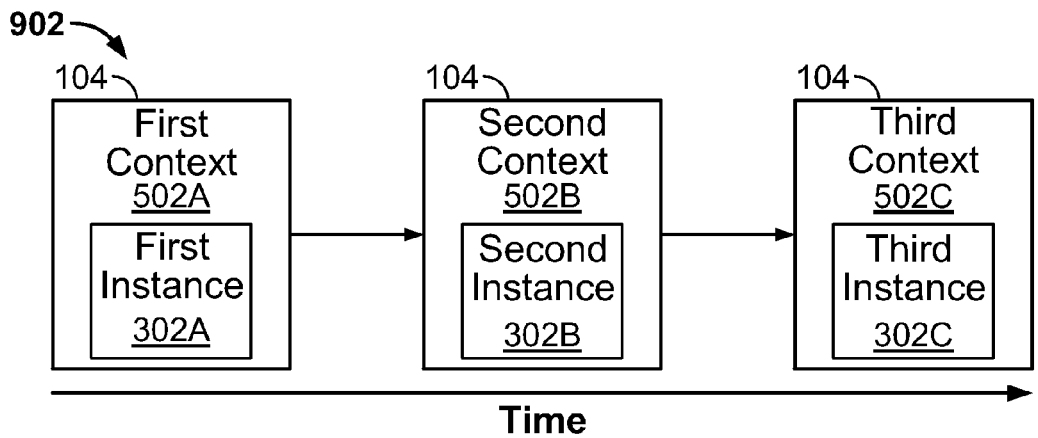
FIG. 9 is a schematic diagram depicting the display of a plurality of different launchpad instances in association with a plurality of different application contexts in a navigation sequence of the first application.

Generally speaking, a plurality of different launchpad instances 302 are displayed in association with a plurality of different application contexts 502 of the first application 104. The plurality of different launchpad instances 302 are displayed individually and sequentially over time. That is, the plurality of different launchpad instances 302 are displayed individually with particular contexts 502 with which they are associated according to the information stored in the persistence 304. FIG. 9 is a schematic diagram that depicts an exemplary navigation sequence 902 of the first application 104, over time, by the user. In the depicted navigation sequence 902, the user navigates from a first context 502A to a second context 502B and then to a third context 502C of the first application 104. As the user navigates from one context 502 to the next, a different launchpad instance 302 is displayed with each of the contexts 502 to which the user has navigated. For example, in FIG. 9, a first launchpad instance 302A is displayed in association with the first context 502A, a second launchpad instance 302B is displayed in association with the second context 502B, and a third launchpad instance 302C is displayed in association with a third context 502C. The user typically navigates by interacting with the user interface elements 506 of the user interface 504 of the first application 104.

The launchpad persistence 304 is communicated with to determine a particular launchpad instance 302 to display in association with a particular context 502 of the first application 104. This communicating can be performed a plurality of different times, once in association with each displaying of a particular launchpad instance 302 with a particular context 502. That is, this communicating is typically an ongoing process performed in tandem with the displaying of the plurality of launchpad instances 302 sequentially in time. The communicating with the launchpad persistence 304 optionally occurs every time the context 502 of the first application 104 changes due to a navigation by the user. The communicating with the launchpad persistence 304 can initially occur upon an initial launching of the first application 104.

The communicating with the launchpad persistence 304 may be performed by different entities, depending on the particular configuration of the launchpad framework 106. The communicating with the launchpad persistence 304 can be performed by at least one of: the first application 104, or a component of the launchpad framework 106. For example, the first application 104 can perform the communicating with the launchpad persistence 304 when the first application 104 is initially launched, to determine an initial launchpad instance 302 to display with an initial context 502 upon launching. In another example, a currently displayed launchpad instance 302 can perform the communicating with the launchpad persistence 304 to determine a particular launchpad instance 302 to display next. The communicating with the launchpad persistence 304 can optionally be performed by both the first application 104 and a currently displayed launchpad instance 302 over the course of an embodiment of the performance of the method 800.

The communicating with the launchpad persistence can include receiving the definition 1002 of the particular instance 302 from the launchpad persistence 304. Either the first application 104 or a component of the launchpad framework 106 can then construct the particular launchpad instance 302 based on the received definition 1002. The received definition 1002 can optionally include at least a portion of, or all of, the set of computer program instructions of the launchpad instance 302. For example, the received definition 1002 can include a complete set of the computer program instructions of the launchpad instance 302.

Returning to FIG. 8, at step 808, when a launchpad control element 508 is activated the user, execution of the second application 108 referenced by the activated control element 508 is initiated. At step 810, the execution of the second application 108 is advanced to a processing stage determined at least by the activated control element 508.

To launch the second application 108, the first launchpad interface 306 first communicates with the first application 104 in response to the activation of the control element 508 by the user. The communicating with the first application 104 occurs as a result of the user interacting with the launchpad instance 302 displayed in association with the displayed context 502. That is, as the user uses the first application 104 and navigates among different contexts 502, different launchpad instances 302 are displayed, and the user may eventually decide to select one of the control elements 508 in one of the displayed launchpad instances 302. For example, the selected control element 508 may correspond to an action that provides information that the user may deem helpful to the task he or she is performing in the first application 104.

The communicating with the first application 104 includes receiving a value of at least one parameter associated with the selected control element 508. Each control element 508 of each launchpad instance 302 can be associated with a launchable action and a corresponding parameter set. The parameter set includes at least one parameter whose value will be passed to the second application 108 to perform the action. The parameter set typically includes, for example, parameters that can determine aspects of the performance of the action by the second application 108, that is, advance the execution of the second application to particular processing states. In response to the selection of the control element 508 by the user, the first launchpad interface 306 communicates with the first application 104 to determine the value of the parameter associated with the selected control element 508. The first launchpad interface 306 can provide information to the first application 104 which identifies the parameter set, the parameter, or both. For example, the provided information optionally includes at least one of the parameter set identifier 1008, or the parameter identifier 1010.

In response to the first launchpad interface 302 communicating the information identifying the parameter to the first application 104, the first application 104 provides a value for the parameter. For example, the first application 104 can provide the parameter value based on the identification of the parameter. In such an example, the first application 104 does not necessarily require any further user input to determine the parameter value to provide to the first interface 306.

In other examples, the value of the parameter is at least partially determined by the first application 104 based on another input provided by the user. For example, the communicating with the first application 104 can occur after a selection of a user interface element 506 (other than the selected control element 508) of the user interface 504 of the first application 104. The selected element 506 can optionally include or be related to textual or numerical data displayed by the first application 104. The first application 104 can then determine and provide the parameter value at least partially based on this other selection in the first application 104. This embodiment provides one aspect that enables tailoring of the launched action to the content of the displayed context 502.

The application launcher 308 launches the second application 108 to perform the action associated with the selected control element 508 of the launchpad instance 302. The launching includes communicating, by the second launchpad interface 310, the determined value of the parameter associated with the action to the second application 108. For each second application 108 in which the application launcher 308 is capable of launching actions, the application launcher 308 includes a particular second communication interface 310 to communicate with that particular second application 108, as shown in FIG. 4. The launching of step 708 also includes communicating the action to be performed to the second application 108. The second application 108 may be configured to perform a plurality of different actions at the request of the application launcher 308, so in this case the communicating of the action to be performed explicitly identifies this action from among the possible actions. In another example, the second application 108 may only perform a single action at the request of the application launcher 308, so there is no need to explicitly communicate the action to be performed in this case.

The method 800 can be performed in association with conducting a transaction in the first application 104, and thus the launching of the action can include launching an action which is related to the transaction being conducted. For example, if the user is conducting a database transaction in the first application 104 at the time of selection of the control element 508 by the user, then the launching the action can include launching the execution of a report by the second application 108 that is related to the database transaction. Generally speaking, the execution of a report by the second application 108 requires providing selection criteria to the second application 108, which retrieves specific data from a database based on the provided selection criteria and displays the results. Thus, in this example, the parameter set associated with the selected control element 508 can include selection criteria for the executing report, and such selection criteria can be provided to the second application 108. Further, the values of the provided selection criteria, i.e., the provided parameter values, can be in part based on other data which has been selected by the user in the displayed context 502.

The first application 104 depicted in FIG. 5A is labeled Critical Variances. FIG. 5A shows a particular context 502 of the Critical Variances application 104 which is labeled Critical Variances—Detail. The exemplary Critical Variances first application 104 may, for example, be an application 104 that a budget planner uses to study spending fluctuations in a company in order to better plan future budgets. In the displayed Critical Variances—Detail context 502, the user is shown budget items that have resulted in spending that was different than originally planned. FIG. 5A also depicts an exemplary launchpad instance 302 displayed in association with the displayed context 502. The exemplary launchpad instance 302 includes a plurality of control elements 508, including control elements 508 labeled Cost Element Reports, Line Item Reports, Change Budget, Request Comment and Contact MIC. Each of the control elements 508 can be associated with a launchable action and a parameter set.

FIG. 5B depicts the exemplary second application 108, having an exemplary embodiment of a user interface 510 of the second application 108, which is launched in response to the selection of one of the control elements 508 of the launchpad instance 302 depicted in FIG. 5A. The particular second application 108 depicted in FIG. 5B is launched in response to the selection of the Line Item Report selectable item 508 depicted in FIG. 5A. The exemplary second application 108 depicted in FIG. 5B is labeled Display Actual Cost Line Items for Cost Centers, and is a line item report.

In FIGS. 5A and 5B, the second application 108 is launched in a manner that is related to both the selected control element 508, and an additional selection by the user of an element 506 of the user interface 504 of the first application 104. That is, the content of the line item report depicted in FIG. 5B is determined not only by the selection of the Line Item Report control element 508, but also by a selection made by the user in the Critical Variances application 104, namely the selection by the user of one of the two rows shown in the Critical Variances—Detail context, specifically the row labeled Development Project: Hyperpumps II. In FIG. 5A, the selected row is indicated by an X-mark 512 next to the selected row. The selection of the Development Project: Hyperpumps II row occurs before the selection of the Line Item Report control element 508, and the content of the line item report depicted in FIG. 5B is specific to the selected Development Project: Hyperpumps II row.

To achieve this specificity of the launched action of the second application 108 to the selected data in the first application 104, the first application 104 provides the parameter value to the first interface 306 of the launchpad framework 106 based on the row selection made in the first application 104, in addition to the selection of the control element 508. In FIGS. 5A and 5B, the parameter set associated with the selected Line Item Report control element 508 is a parameter set that will tell the second application 108 which line item report to produce. Furthermore, the parameter value provided by the first application 104 is a value which is based on the selection of the Development Project: Hyperpumps II row.

In FIGS. 5A and 5B, the user may be performing a database transaction related to budgets. For example, the user's use of the Critical Variances application 104 may be part of a database transaction that will conclude with the creation of a new budget. The data displayed on the Critical Variances—Detail context 502 may be the result of database transaction that resulted in the displayed data. Within this context 502, the launchable actions provided by the launchpad instance 302 all optionally provide actions which are associated with the data involved in the transaction.

The first application 104 can include a provider object class which communicates with the first launchpad interface 306 to provide the parameter value. The provider class is an object-oriented object class which is called by the first interface 306 to provide the parameter value. The provider class includes functions and data. The functions of the provider class respond to the communication with the first interface 306 of the launchpad framework 106, and determine the parameter value of the parameter indicated by the first interface 306. If the parameter value is to be determined based on the selection of an element in the first application 104 in addition to the selection of the control element 508, a function of the provider class determines which user interface items 506 are selected in the displayed context 502, and determines the parameter value based on the selected user interface elements 506. The provider class can optionally hold the parameter value by reference. That is, the provider class can include a data element that corresponds to the parameter value it will provide to the first interface 306, but this data element is a reference to the parameter value. Holding the parameter value by reference enables the provider class to determine the parameter value dynamically in response to selection of different elements 506 of the user interface 504 of the first application 104.

FIGS. 6A and 6B depict embodiments of the first and second applications 104 and 108 in which the launchpad instances 302 includes control elements 508 which are associated with actions other than executing or retrieving reports. For example, FIG. 6A includes a context 502 labeled Express Planning and an exemplary launchpad instance 302 having control elements 508 labeled Google (URL) and Excel (File). FIG. 6B depicts an exemplary second application 108, having an exemplary embodiment of the user interface 510 of the second application 108, which is launched when the user selects the Excel (File) control element 508 in FIG. 6A. The exemplary second application 108 depicted in FIG. 6B is an Excel spreadsheet which contains content related to the content of the context 502 depicted in FIG. 6A. In a similar manner, the launched action can launch files in any number of different second applications 108. Likewise, although not depicted, if the user selects the Google (URL) control element 508, the second application 108 optionally includes a web browser which displays the Google website. In both cases, the launched action may be launched using a determined parameter value which is dependent on an additional selection in the context 502 of the first application 104. For example, in the case of the Excel (File) control element 508, the launched Excel spreadsheet is optionally chosen based on a parameter determined by a selection of one of the rows of data shown depicted in FIG. 6A. Similarly, the Google (URL) selectable item 508 may launch the Google URL with an appended search string based on a parameter value determined based on a row selected in FIG. 6A.

The communicating with the launchpad persistence 302 to determine the state of the launchpad service, of step 804, can include providing a key to the launchpad persistence 304 to identify the particular context 502 with which the particular launchpad instance 302 is to be associated. The first application 104 or a component of the launchpad framework 106, such as a currently displayed launchpad persistence 302, can provide the key to the persistence 304. The key is used by the launchpad persistence 304 to select the particular launchpad instance 302 from among the plurality of instances 302 for which information is stored by the persistence 304. The key includes an identification of the particular application context 502.

The determination of which launchpad instance 302 to display in association with a particular application context 502 can be determined based not only by the identity of the context 502, but also in part by the identity of the particular user using the first application 104. For example, the key provided to the persistence 304 can identify the user. Additionally, the user can optionally belong to a user group or have a user role. A user group is a grouping of the user with other users. Grouping of users may be convenient to identify divisions of users within an organization. For example, the user groups may respectively correspond to users located in different countries, users who speak a particular language, etc. A user role typically identifies and classifies the user according to the user's role within an organization. The role assigned to the user optionally corresponds to his or her job title. For example, all of the engineers at a company may be assigned a role named Engineer. Roles may be useful to provide a classification of users that cuts across different groups. If the user belongs to a user group or has a user role, the determination of which particular launchpad instance 302 to display in association with a particular application context 502 can be based in part upon at least one of: the identity of the user, the group of the user, or the role of the user. For example, the key provided to the persistence 304 can optionally identify at least one of: the identity of the user, the group of the user, or the role of the user.

Figure 10A:
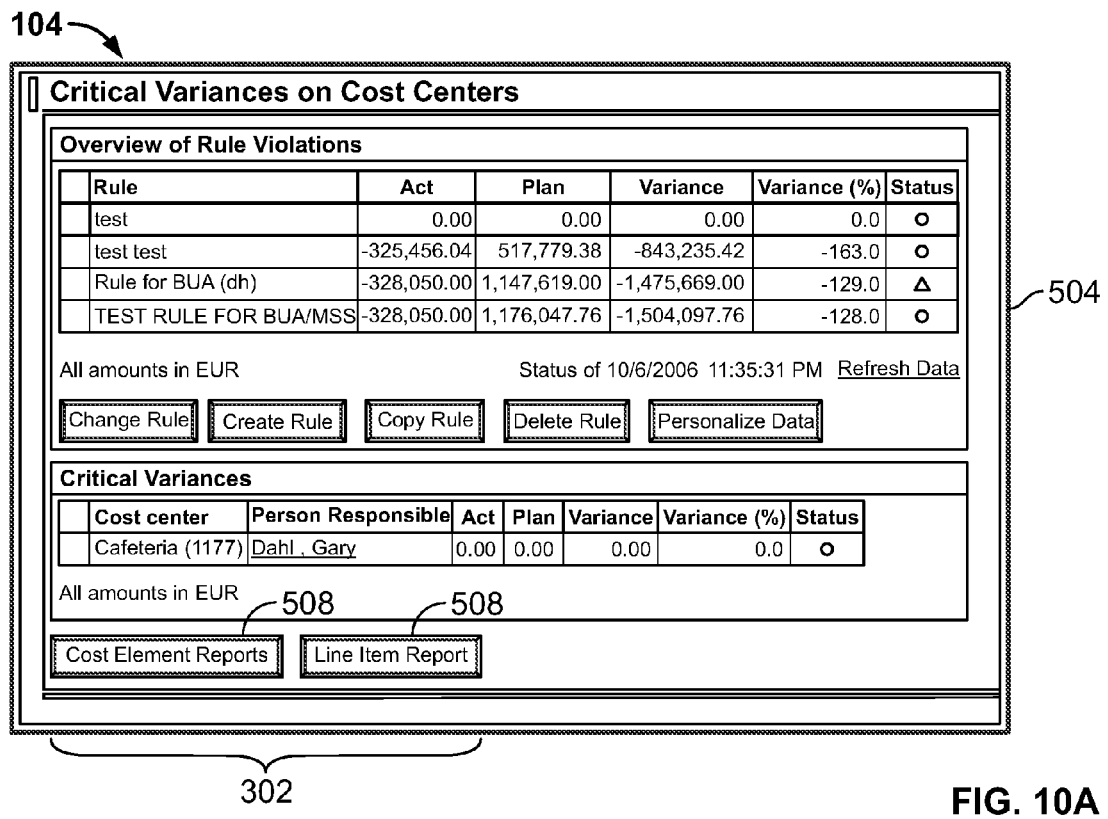
FIG. 10A depicts another embodiment of the display of the launchpad instance in association with the context of the first application.
Figure 10B:
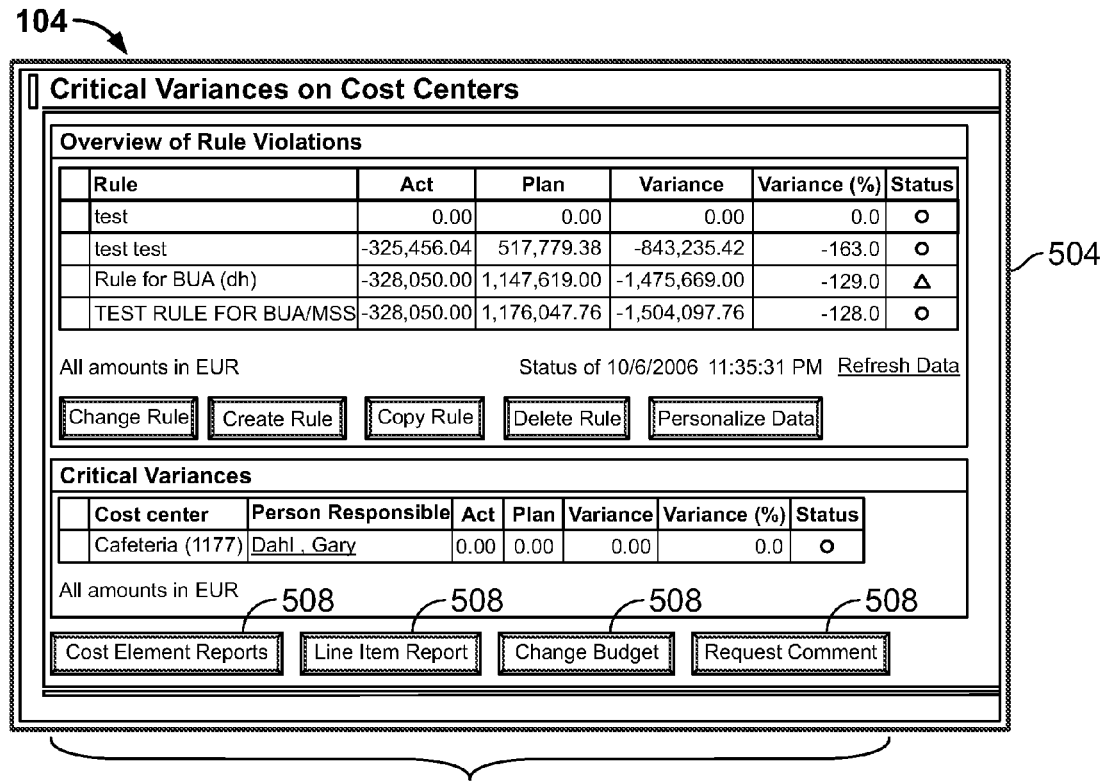
FIG. 10B depicts the context of the first application depicted in FIG. 9A displayed in association with a different launchpad instance than that depicted in FIG. 9A.

FIGS. 10A and 10B depict exemplary embodiments of the display of different launchpad instances 302 with a particular application context 502 according to at least one of: the identity of the user, the role of the user, or the group of the user. In FIGS. 10A and 10B, the particular launchpad instance 302 displayed in association with the shown application context 502 varies according to user role. FIG. 10A depicts a launchpad instance 302 having two control elements 508, one labeled Cost Element Reports and another labeled Line Item Report. The role of the user using the first application 104 depicted in FIG. 10A may be, for example, a Manager. FIG. 10B depicts the same application context 502 depicted in FIG. 10A, but which is displayed in association with a different launchpad instance 302. The launchpad instance 302 shown in FIG. 10B has four control elements 508, including the Cost Element Reports and Line Item Report control elements 508 shown in FIG. 10A, and also control elements 508 labeled Change Budget and Request Comment. The role of the user using the first application 104 depicted in FIG. 10B may be, for example, a Business Unit Analyst. The exemplary Business Unit Analyst role may be responsible for making budge decisions, possibly involving modifying budgets for a number of different departments of a particular business unit. By contrast, the exemplary Manager role may be a manager of only one of those departments, and not have the authority to change the budget for his or her department, and thus not have the need or permission to access the additional control elements 508 depicted in FIG. 10B.

The user configuration interface 312 of the launchpad framework 106 enables the user to access and modify the definitions 1002 and display associations of at least some of the plurality of launchpad instances 302 stored in the launchpad persistence 304. A particular user can access the definitions 1002 and display associations of the launchpad instances 302 which are displayed for that particular user. The method 800 can optionally include displaying the user configuration interface 312 to the user, and receiving a first configuration input from the user at the user configuration interface 312, the first configuration input at least in part determining the definition 1002 of at least one of the plurality of instances 302 which is displayed for that user. The first configuration input provided by the user can change at least one of: the definition 1002 of a particular launchpad instance 302, or the display associations of the particular launchpad instance 302.

The administrator configuration interface 314 of the launchpad framework 106 enables an administrator to access and modify the definitions 1002 and display associations of the plurality of launchpad instances 302 stored in the launchpad persistence 304. The administrator is an administrator of the computing privileges of a group of users of the computing environment 200. The administrator has the ability to access and modify the definitions 1002 and associations of launchpad instances 302 of each user for which the administrator administrates. The method 800 can optionally include displaying the administrator configuration interface 314 to the administrator, and receiving a second configuration input from the administrator at the administrator configuration interface 314, the second configuration input at least in part determining the definition 1002 of the plurality of defined instances 302, the plurality of defined instances 302 being associated with a plurality of different users. The second configuration input provided by the administrator can change at least one of: the definitions 1002 of a plurality of different launchpad instances 302 associated with a plurality of different users, or the display associations of the plurality of different launchpad instances 302 associated with the plurality of different users.

The launchpad framework 106 can optionally include a plurality of user configuration interfaces 312, for use by a plurality of different users, and a plurality of administrator configuration interfaces 314, for use by a plurality of different administrators.

Figure 11A:
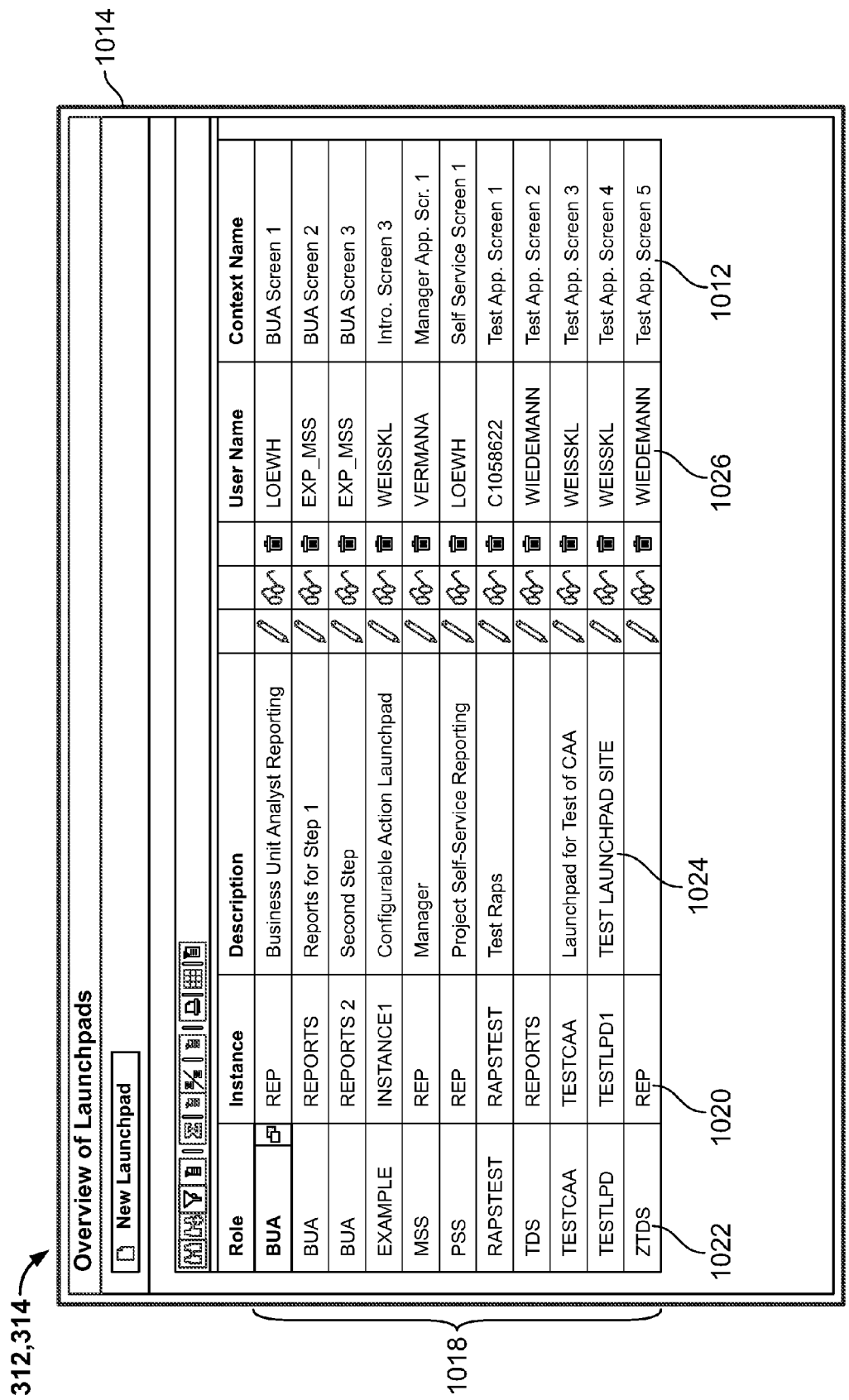
FIG. 11A depicts one embodiment of a first portion of a user or administrator configuration interface.
Figure 11B:
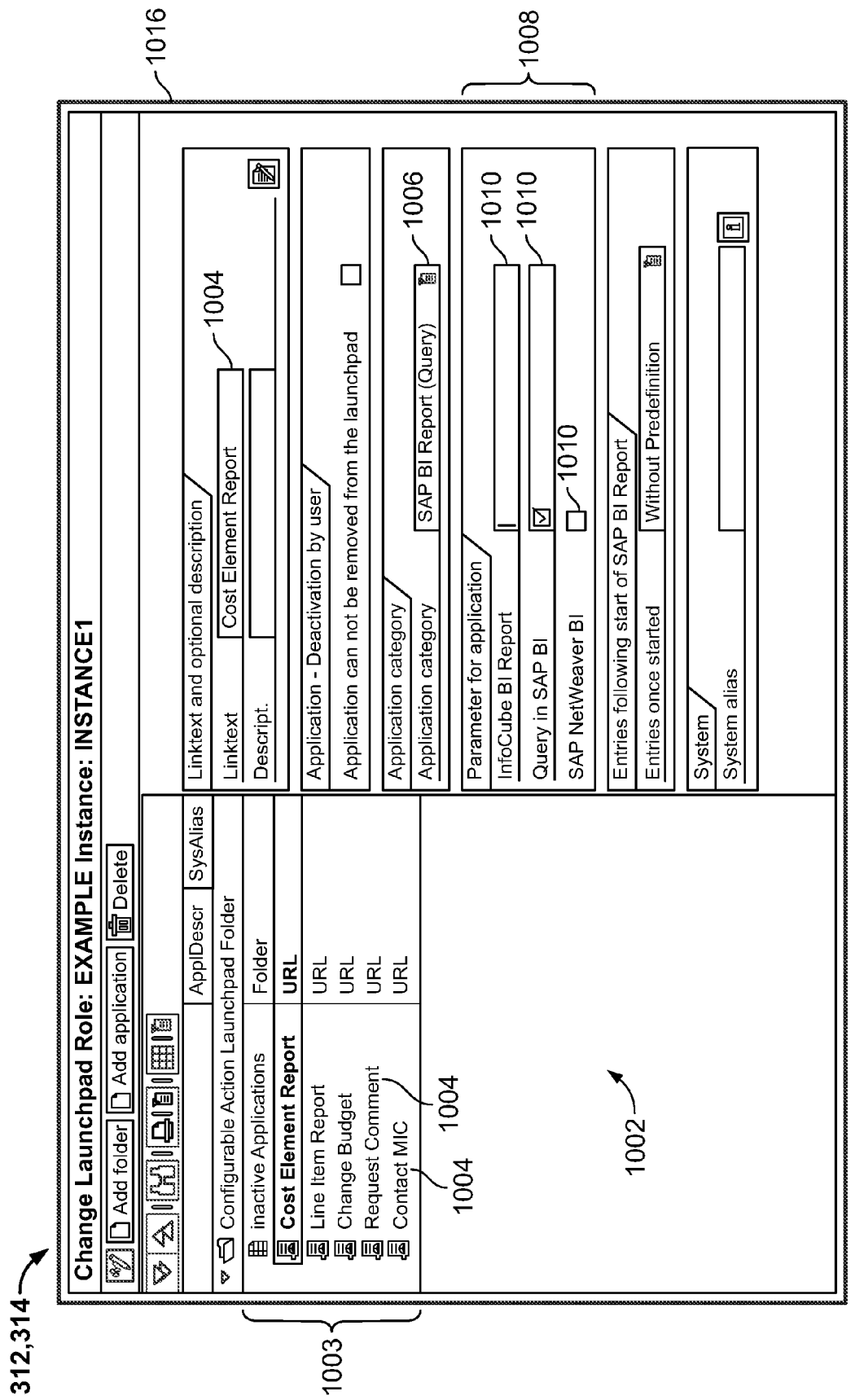
FIG. 11B depicts one embodiment of a second portion of the user or administrator configuration interface.

FIGS. 11A and 11B depict exemplary user and administrator configuration interfaces 312 and 314. The depicted embodiments of FIGS. 11A and 11B can be of either the user or administrator interfaces. Other embodiments which perform the same functionality are also possible, however, and different user interface elements can be used to implement the user and administrator configuration interfaces 312 and 314.

FIG. 11A depicts an exemplary first portion 1014 of the user or administrator configuration interface 312 or 314. The depicted first portion 1014 displays the list 1018 of the plurality of launchpad instances 302 for which information is stored in the launchpad persistence 304 and which are able to be accessed and modified using the depicted user or administrator configuration interface 310 or 314. The exemplary list 1018 of launchpad instances 302 includes instance identifiers 1020, role identifiers 1022 associated with each instance 302, a description 1024 of each instance 302, a user identifier 1026 associated with each instance 302, and the context identifier 1012 with which each instance 302 is associated. The depicted list 1018 of launchpad instances 302 includes instances 302 associated with a plurality of different users. In an embodiment in which FIG. 11A represents the administrator configuration interface 314, the administrator is able to access and modify the stored information related the instances 302 associated with the plurality of different users depicted. In an embodiment in which FIG. 11A represents the user configuration interface 310, the user would only be able to access and modify the stored information related to the instances associated with that particular user. Alternatively, in another embodiment (not shown) of the first portion 1014 of the user configuration interface 311, the list 1018 of instances 302 only displays instances 302 associated with the particular user using the user configuration interface 312.

The user and administrator configuration interfaces 312 and 314 can be used to modify the association of particular launchpad instances 302 with particular application contexts 502. This can be accomplished by selecting and editing the context identifier 1012 displayed with a particular instance 302 in the displayed list 1018 of instances 302. The administrator configuration interface 314 can also be used to modify the association of particular launchpad instances 302 with particular users. This can be accomplished by the administrator selecting and editing the user identifier 1026 displayed with a particular instance 302 in the displayed list 1018. The administrator can also optionally create new instance definitions 1002. The administrator creates a new instance definition 1002 by at least one of: copying and modifying an existing instance definition 1002, creating a new instance definition 1002 from a blank instance definition, or creating a new instance definition 1002 from a template instance definition.

FIG. 11B depicts an exemplary second portion 1016 of the user and administrator configuration interfaces 312 and 314. The second portion 1016 of the user and administrator interfaces 312 and 314 is displayed upon, for example, the selection of a particular launchpad instance 302 in the list 1018 of launchpad instances 302 in the first portion 1014 of the user and administrator configuration interfaces 312 and 314. The second portion 1016 shows the details of the definition 1002 of a particular launchpad instance 302. For example, the depicted exemplary second portion 1016 includes, on the left hand side of the display, the ordered list 1003 of control element identifiers 1004 associated with the particular instance 302. On the right hand side, for a particular control element identifier 1004 highlighted on the left hand side, is displayed information associated with that particular control element 508, including the control element identifier 1004, a deactivation control for removing or deactivating the control element 508 from the launchpad instance 302 by a user (this option may only be active in an administrator configuration interface 314), the action identifier 1006 indicating the launchable action associated with the control element 508 and the second application 108 to launch the action, and the parameter set identifier 1008 associated with the launchable action. In FIG. 11B, the action identifier 1006 integrally also indicates the second application 108, and the parameter set identifier 1008 comprises a plurality of parameter identifiers 1010.

The user can optionally access the user configuration interface 312 from the launchpad instance 302. FIG. 12 depicts an exemplary launchpad instance 302 which has a plurality of control elements 508, one of which is labeled Change Actions. Upon selection of the Change Actions control element 508, the second application 108 which is launched is the user configuration interface 310 of the launchpad framework 106.

Further embodiments are also possible, which are the result of variously combining steps, elements or embodiments described herein. For example, further embodiments may include an altered order of the steps of the method 800 described herein, the result of which may be an embodiment particularly suited to a specific purpose or implementation. In another example, embodiments of the method 800 may include or exclude optional steps described herein. In yet another example, different embodiments of the method 800 may be combined to create further embodiments. Additional embodiments, which would be discernable based on the description herein, are also possible.

What is claimed is:

1. A method, comprising:
   during execution of a first application program in which a user interacts with the first application program, executing a launchpad service that invokes a second application program, wherein the first and second application programs include user interfaces to execute database transactions;
   in response to the user interface of the first application program being refreshed:
      determining a state of the launchpad service based on the refreshed user interface,
      displaying one or more launchpad control elements, depending on the determined state of the launchpad service, along with the refreshed user interface;
   in response to one of the one or more launchpad control elements being activated by an operator:
      initiating execution of the second application program referenced by the activated launchpad control element, and
      advancing execution of the second application program to a processing stage determined by the activated launchpad control element, including communicating to the second application program a plurality of parameter values determined based on a selected element of the refreshed user interface of the first application program other than the activated launchpad control element;
   displaying a first configuration interface to the user; and
   receiving a first configuration input from the user at the first configuration interface to at least in part define a plurality of states of the launchpad service, including their correspondence to the user and different configurations of the user interface of the first application.

2. The method of claim 1, wherein the processing stage to which the second application is advanced is also determined by a selected element of the refreshed user interface other than the activated launchpad control element.

3. The method of claim 1, wherein the determining the state of the launchpad service comprises communicating with a data storage outside of the first application that stores information correlating the state of the launchpad service to a particular configuration of the refreshed user interface.

4. The method of claim 3, wherein the communicating with the data storage comprises receiving an ordered list of the one or more launchpad control elements, and for each launchpad control element, an associated action and parameter set.

5. The method of claim 3, wherein the communicating with the data storage comprises providing a key to a launchpad persistence, the key comprising an identification of the particular configuration of the refreshed user interface and an identification of at least one of: the user, a role of the user, or a group of the user.

6. The method of claim 1, further comprising:
displaying a second configuration interface to an administrator; and
receiving a second configuration input at the second configuration interface from the administrator, the second configuration input at least in part determining a definition of at least one of the plurality of states of the launchpad service which are associated with the user.

7. A computer-readable medium comprising computer program instructions, which when executed by a processor perform a method, the method comprising:
during execution of a first application program in which a user interacts with the application program, executing a launchpad service that invokes a second application program, wherein the first and second application programs include user interfaces to execute database transactions;
in response to the user interface of the first application program being refreshed:
determining a state of the launchpad service based on the refreshed user interface, and
displaying one or more launchpad control elements, depending on the determined state of the launchpad service, along with the refreshed user interface;
in response to one of the one or more launchpad control elements being activated by an operator:
initiating execution of the second application program referenced by the activated launchpad control element, and
advancing execution of the second application program to a processing stage determined by the activated launchpad control element, including communicating to the second application program a plurality of parameter values determined based on a selected element of the refreshed user interface of the first application program other than the activated launchpad control element;
displaying a first configuration interface to the user; and
receiving a first configuration input from the user at the first configuration interface to at least in part define a plurality of states of the launchpad service, including their correspondence to the user and different configurations of the user interface of the first application.

8. The computer-readable medium of claim 7, wherein the processing stage to which the second application is advanced is also determined by a selected element of the refreshed user interface other than the activated launchpad control element.

9. The computer-readable medium of claim 7, wherein the determining the state of the launchpad service comprises communicating with a data storage outside of the first application that stores information correlating the state of the launchpad service to a particular configuration of the refreshed user interface.

10. The computer-readable medium of claim 9, wherein the communicating with the data storage comprises receiving an ordered list of the one or more launchpad control elements, and for each launchpad control element, an associated action and parameter set.

11. The computer-readable medium of claim 9, wherein the communicating with the data storage comprises providing a key to a launchpad persistence, the key comprising an identification the particular configuration of the refreshed user interface and an identification of at least one of: the user, a role of the user, or a group of the user.

12. The computer-readable medium of claim 7, further comprising:
displaying a second configuration interface to an administrator; and
receiving a second configuration input at the second configuration interface from the administrator, the second configuration input at least in part determining a definition of at least one of the plurality of states of the launchpad service which are associated with the user.

* * * * *